United States Patent [19]

Amlang et al.

[11] Patent Number: 4,864,510
[45] Date of Patent: Sep. 5, 1989

[54] TRANSPORTING FREIGHT

[75] Inventors: Klaus-Peter Amlang, Delmenhorst; Jochen Soller; Guenter Vogg, both of Bremen, all of Fed. Rep. of Germany

[73] Assignee: MBB GmbH, Bremen, Fed. Rep. of Germany

[21] Appl. No.: 88,863

[22] Filed: Aug. 24, 1987

[30] Foreign Application Priority Data

Aug. 27, 1986 [DE] Fed. Rep. of Germany ....... 3629094

[51] Int. Cl.$^4$ ...................... G06F 15/20; B65G 65/00
[52] U.S. Cl. .................... 364/478; 198/349; 414/273
[58] Field of Search ............... 364/478, 468; 414/134–136, 268–274, 285, 137; 104/88, 130; 198/341, 349, 356, 358, 362, 365, 571, 575; 244/137.1

[56] References Cited

U.S. PATENT DOCUMENTS 3,796,327  3/1974  Meyer ........................ 414/273 X
4,053,741  10/1977 Ainoya et al. ................. 364/478
4,472,783  9/1984  Johnstone et al. ............ 364/478 X
4,669,047  5/1987  Chucta ........................ 414/136

Primary Examiner—Joseph Ruggiero
Attorney, Agent, or Firm—Ralf H. Siegemund

[57] ABSTRACT

The circuit includes a master control circuit and individual control circuits for each storage location which are linked in such a manner that organized transport of freight is made possible in both directions; a manual control override disables the automated transport to permit manual transport of containers without impediment by the control circuit.

9 Claims, 3 Drawing Sheets

TRANSPORTING FREIGHT

BACKGROUND OF THE INVENTION

The present invention relates to a circuit for controlling the transport of containers, freight pallets or the like in mobile cargo space and/or within a system which includes a transport path in and along storage locations for containers, and further includes stationary drives acting on the containers to move them along; the drives are being controlled by a follow-up control logic circuit that is operated from a control panel. The movement, of course, has to be reversible to accommodate loading and unloading.

The transport of containers, pallets or the like for example, in the interior of an airplane, for purposes of loading and unloading, poses certain logistic problems. On one hand the available space is minimal while on the other hand, loading and unloading should take little time only, simply because in terms of flying time loading is an idle period for the aircraft.

Automated control system have been developed and are used for loading and unloading an aircraft, particularly so-called wide body planes. For example, the German printed patent application No. 2,135,925 describes such an automatic transport control system which includes a control panel for operating and controlling the movement to and from storage locations in the cargo space in aircraft under utilization of a programmable follow-up control and logic circuit for purposes of loading and unloading the craft.

Transport and moving of a container is carried out by stationary motor drives, under cooperation with switches, control and latching elements, and so forth. These components are automatically turned on and off as a result of operation of the follow-up control initiated by the operator working the panel. The whole purpose here is that only those elements are turned on, which are immediately affecting the transportation and movement.

Such an automated transport system does not use much energy but requires that no interference occurs. On the other hand, handling of containers in and around aircraft makes almost inevitable that here or there some interfering actions are encountered. They may in some cases be of very minor nature or interference may be caused by ecological or environmental conditions, but as a consequence of even a minor interference, the whole system may come to a halt. As the automation is blocked manually shifting of the containers is required in order to overcome the interference and eliminate further down time. These situations may be inevitable, on one hand, but are still highly undesirable, on the other hand. Correction will be time consuming and, from a logistic point of view, may be quite complicated. The reason for expecting complications is that the various switches associated with the storage locations will in effect be operated by the logic circuit only, but that circuit may not be operative at that point in time.

DESCRIPTION OF THE INVENTION

It is an object of the present invention to provide a new and improved arrangement for transporting and moving freight containers, for example, in the interior of an aircraft or any other kind of mobile but rather confining cargo space, combining the advantages of automated control with ease of manually removing freight pieces on occurrence of any disturbance.

It is a particular object of the present invention to provide a new and improved control circuit for the transport control of freight containers and mobile cargo spaces which enclose a plurality of storage locations for containers, a transport path and stationary drive elements which act on the containers in or at the various locations, and under utilization of a follow-up logic and directional control for determining, through switching devices, the direction of load pieces.

In accordance with the preferred embodiment of the present invention, it is suggested to provide a transport mode control switch operated from the operators panel, which switch acts upon a bi-stable stage which, in turn, affects the output of a clock. A plurality of storage locations each include a drive control, and all of these drive controls are prepared by that bi-stable stage or can be neutralized (off) by the operation of the transport mode control switch. The clock signals are gated into one or the other clock path depending upon the direction of transport either to reach the first or the last of the transport path-storage locations; each storage location includes directional and other switch means to be described.

The circuit generally includes a master control circuit and individual control circuits for each storage location which are linked in such a manner that organized transport of freight is made possible in both directions with manual control override for disabling the automated transport to permit manual transport of containers without impediment by the control circuits.

The various switches in a station and storage location provide a plurality of functions. The main function is to turn on a drive of that station. A holding circuit for that drive control runs either to the succeeding or to the preceding station, to be interrupted when that succeeding or preceding station directly controls its drive. These switches make also sure that sequential clock pulses progressively turn on the next drive and turn off the preceding drive. The next clock pulse will turn on that latter next drive which interrupts the aforementioned holding circuit.

The control device is preferably organized as follows. A main or master control circuit includes a manually operable transport mode control switch for operating a bi-stable switching stage; a clock pulse generator is connected to be enabled by the bi-stable switching stage; a switching device in the main control circuit is operated by the mode switch and the bi-stable switching stage for connecting an output of the clock generator to a first and a second clock line; a drive control relay means in each station includes a holding circuit and has contact means for operating of the respective drive of the station, all the drive control relay means being enabled by the bi-stable switching stage; clock pulse circuit means is connected to the first and second lines and is further connected to all stations for causing a clock pulse when received and not passed to another station, to operate the drive control relay; directional control means in each respective station is operated by the mode control switch has (a) a first circuit means for causing the drive of a preceding or of a succeeding station to be turned on in response to response of a pulse control relay of the respective station; (b) a second circuit connected to the clock pulse circuit for determining the direction of clock pulse propagation through such clock pulse circuit or diversion to the drive control relay of the respective station; and circuit means (c) in the holding circuits for the drive control in the succeeding or preceding stations depending upon the direction of transport; further switch devices are additionally included in each station and pertain to the clock pulse circuit means thereof, for diverting a clock pulse out of the circuit means if the drive control relay of the respective station was operated by a preceding clock pulse to affect the clock pulse circuit means of the succeeding or the preceding station depending upon an operational state of the directional control means (b); a still further switch means in the main and master control circuit are also operated by the mode control switch for connecting a supply voltage selectively to a first and a last of the stations to function as power supply for the drive holding circuit herein.

The inventive structure its features and the combination of features has the advantage that upon operating the transport switch, the entire cargo and freight control system is turned on and off whereby on turning on the clock provides for the drives to be connected in a sequence that depend upon the direction of transport with an inverse order obtained on turning off. Thus, in case of an interference somewhere, the entire freight control system will be turned off by means of the transport control switch to now permit the positioning and movement of any container by manual operation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE DRAWINGS

Figure 1:
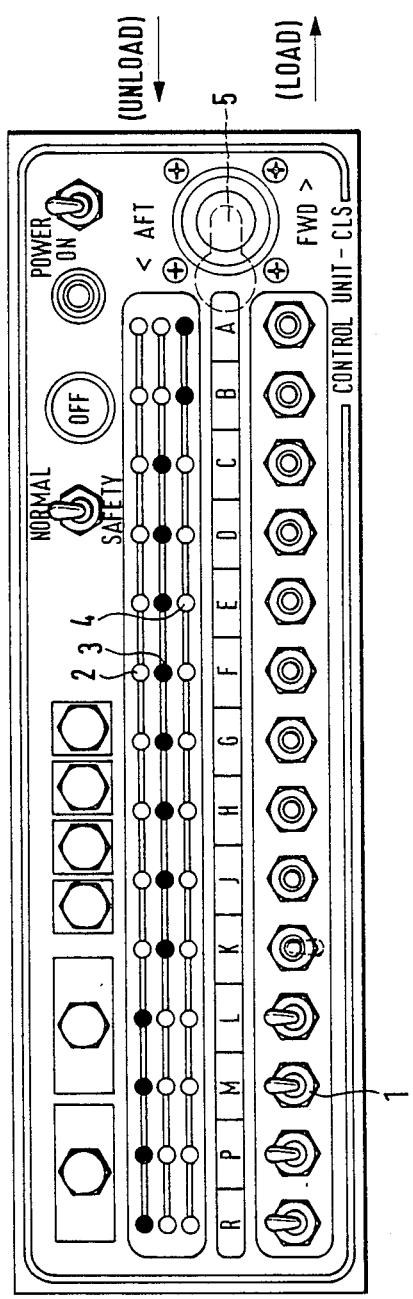
FIG. 1 is a plane view of an operator panel.

FIG. 1 shows an operator panel and particularly a field of organization of various switches and indicators. The figure can be deemed to be a symbolic representation of the freight area. Each of the freight or cargo spaces for storing, for example, a particular container, is identified here with one of the letter A-R, and it is assumed that they are arranged along a one track transport path. Each of these storage locations, besides being identified by one of the letters A-R, is further identified by three lamps, 2 for red, 3 for green and 4 for yellow. The three lamps per location are aligned and with an operating switch 1 which in its upper position, as indicated by way of example for the locations L-R, represents an "ready" situation in the switch position. The switch for the position K is another position, separating the blocks of locations to the right and to the left. The remaining switches A-J are shown in a medium or neutral position, indicating availability of the respective storage location.

Reference numeral 5 refers to an operating lever which will be explained more fully with reference to FIGS. 2A and 2B. The lever 5 has to be adjusted to operate the main transport switch 6. The lever 5 has adjusting positions which prepare the effective mode for the operation either a loading mode or an unloading mode. The lamps 2,3 and 4 indicate the state of the respective storage space with red meaning that the places occupied, green that is unoccupied and yellow indicating next in line for occupancy.

Figure 2A:
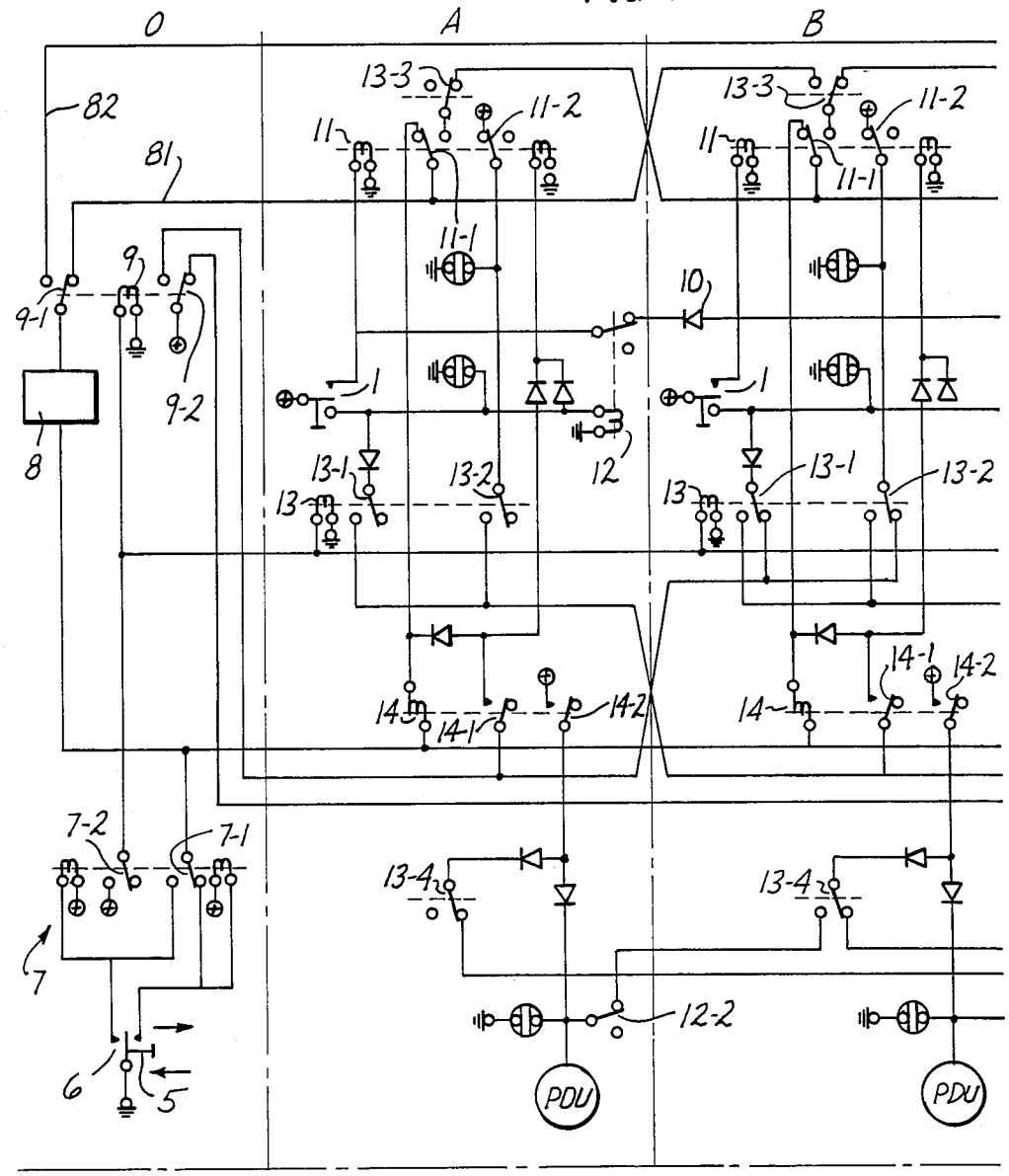
FIGS. 2A and 2B illustrate an electric circuit for control of freight system in accordance with the preferred embodiment of the present invention.
Figure 2B:
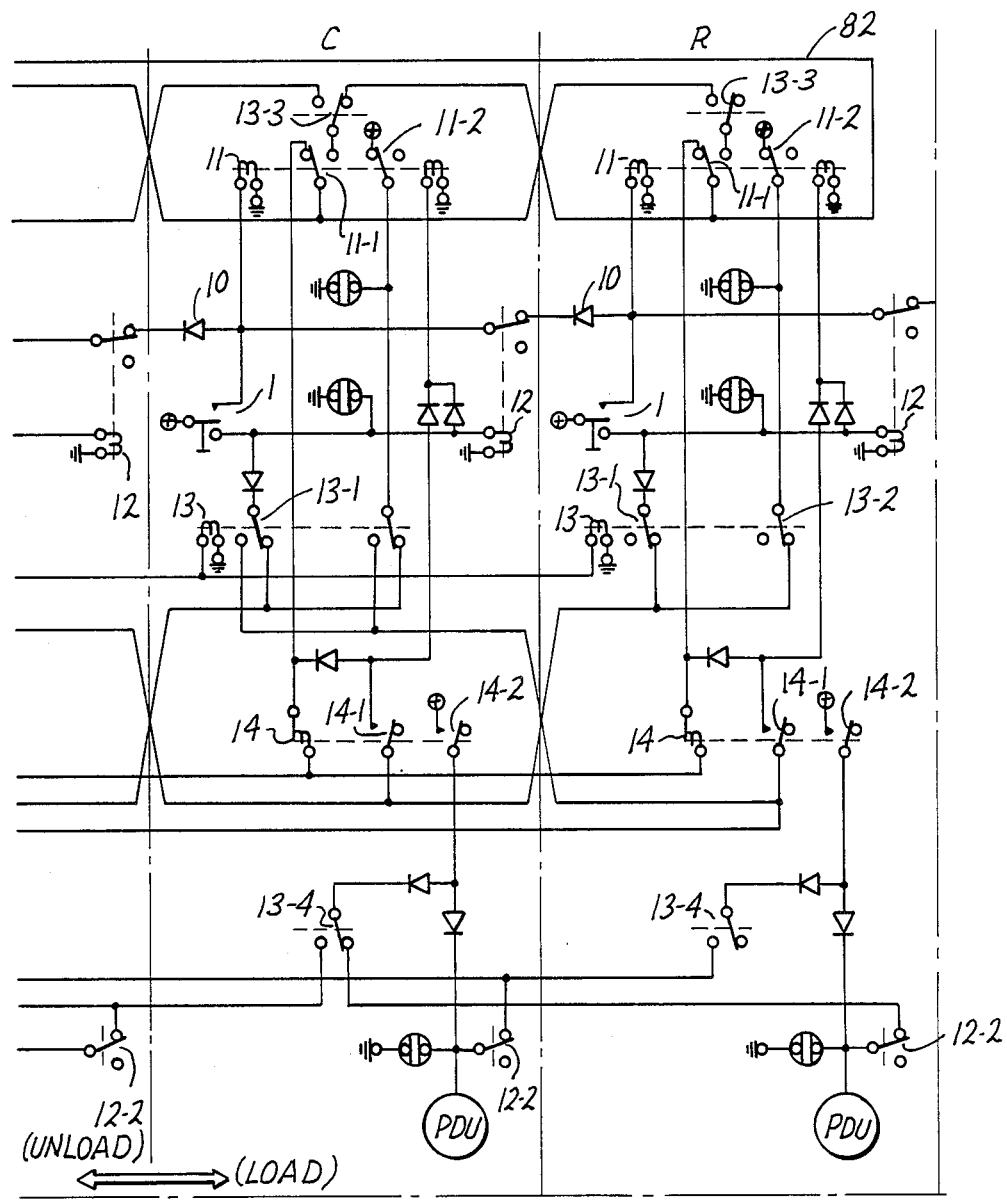

Proceeding now the description of FIGS. 2A and 2B, the various storage locations A-R are, of course, similarly constructed. They each are under control of a certain circuit configuration which, as a kind of subcomponent, have a particular similarity in their circuit configuration. These circuits are bi-directionally interlinked as will be explained more fully below. In front of all of them is a particular circuit portion identified with reference numeral 0. This circuit 0 includes the adjusting and transport switch 6, operated by lever 5 and which, in a right hand position (FIG. 1), indicates loading and left hand position represents unloading. Lever 5 operates the transport switch 6 in a keying fashion. In a middle position of lever 5-switch 6, the entire freight loading system is disconnected in the left position (also FIGS. 2A and 2B) there the switch 6 controls unloading and in the right position loading.

The switch 6 operates a bi-stable switching stage 7, having two coils which are, respectively, energized by left and right-hand states of switch 6 for the loading and the unloading operating modes. The bi-stable circuit breaker 7 remains in the respective last switching state during periods when the switch 6 is in the middle or neutral position. If the circuit generally is in a switching state loading, then the right hand coil of circuit breaker 7 is energized. If the operating mode before was different, the circuit breaker 7 will now change the switching state. In this switching state loading a clock generator 8, as turned on through a contact 71, of the circuit breaker 7 (FIGS. 2A and 2B show contact 7 in that position). Moreover, each of the stations or locations A through R has a master control relay 14, and all of them are enabled by contact 71 when in the loading mode position.

As clock 8 is turned on its issues pulses of an adjustable, predetermined and definite frequency and pulse rate. These pulses are passed through a contact 9-1 of a relay 9, to obtain a connect of the clock output either to a line 81 or to a line 82. The line 81 is run to the beginning of the transport path which is the storage location A. The line 82 runs to the end, station or location R. In the illustrated, un-energized position of relay 9, the pulses will be passed to the line 81, i.e. to the circuit of the storage location A which constitutes the beginning of the transport path. This obtains through the resting or neutral position of a contact 11-1 of a bi-stable relay 11, being a part of the circuit of storage location A. The contact 11-1 controls the coil of relay 14 of that location in that the pulse line 81 is connected to that coil of relay 14. The other side of the coil of relay 14 is connected to the contact 7-1 of the relay 7. By means of which, as stated earlier, all relays 14 in all locations are enabled. Upon being energized, relay 14 holds in the energized state by means of a holding contact 14-1 pertaining to a holding circuit of the relay 14. The connection, in addition, runs through a contact 13-2 and 11-2 of the circuit pertaining to the storage location B, to positive potentials. Upon energizing relay 14 and upon the relay holding itself in the energize state through the respect of contact 14-1, a drive PDU for that location A is turned on by contact 14-2, in order to provide a transport motor for a container which is in the location A. A contact 13-4 of un-energized relay 13 in station A connects the drive PDU pertaining to storage location B to positive potential via a contact 12-2 of an un-energized relay 12 in station B. This means, in fact, that a container is transported from location A to location B whereby the drive PDU in location A moves the container out of the location A and the drive PDU in location B causes the container to be transported into that location. Of course, the container will stop if the drive PDU in location C has not been turned on also. This is, indeed, not the case as long as the relay 14 in status B or C are not energized.

The holding circuit for the relay 14 of station A, moreover, connects positive voltage through its contact 14-1 also to the righthand coil of bi-stable relay 11 also pertaining to location and station A. Consequently, the contacts 11-1 and 11-2 in A change position, and the next pulse from the clock 8 runs through the operating state of the contact 11-1, the neutral state of the contact 13-3 to the circuit of the location B.

It can readily be seen that each station has four relays. There is the principle, drive controlling relay 14 (14-2 to PDU). There is the directional control relay 13 whose drive controlling contact 13-4 guides energizing current through the drive control relay contact 14-2, either to the drive of the preceding or to the succeeding station and location. The latter operation was described thus far.

A companion relay 12 is provided for the directional control. Relay 11 is a pulse guiding and pulse distributing control relay 11. The spacing in time between the pulses provided by the clock 8 as well as the duration of these pulses itself is of course, adjustable in such a manner that the control obtains positively, at a fast rate, but without the danger of any uncontrollable overlap. On the other hand, the clock pulses should be so fast that in fact one stage after another can be controlled to transfer the running on of a actual physical container movement upon the respective drives, one after the other. The container will, thus, be moved in a quasi continuous process from the entrance location A, in this case up to a location from which it will not be moved because the next one is already occupied.

Upon appearance of a second pulse from clock 8, the pulse finds a connection that runs through the contact 11-1 of energized relay 1 of station A to the circuit of station B. Herein, the pulse passes through the neutral or un-energized state of contact 11-1 in station B to the relay 14 of that station which, as all other relays 14, had been appropriately prepared as described. The operation thereafter, is just as was described with reference to station and location A, which means that its relay 14 is energized by that pulse from clock 8. It has its own holding circuit which includes contact 14-1 of the station B, as well as contacts in station C, and, therefore, provides now for operation in circuit C which means that the drive PDU of station C is turned on to take over the piece of cargo or container from the station B.

Simultaneously with the operation in stations B and C by and through this second clock pulse, station A has its drive PDU disconnected because, at this point in time, no further load is desired to be moved by in or through the location A. Turning off of this drive PDU of station A runs through changing state of the bistable relay 11 in station B whose contact 11-2 effect interrupts the holding circuit for relay 14 of location A. As relay 14 in station A de-energizes, drive PDU in station A stops.

Upon turning on relay 11 of station B, also a path is prepared for the next (third) clock pulse to station and location C which causes relay 14 of that station to energize. The changeover of the contact 11-1 of station B select that new path for the next pulse which is now the third one, to energize relay 14 of station C. The sequence to be considered will turn on the next appropriate relay drive 14, turn off drive PDU in station B and prepare the next station D and so forth until the last available location is reached. The holding circuit for this particular last relay 14 is assumed to be in station R which one can see. The holding circuit for the relay 14 station R is fed back to the 0 circuit wherein it is connected to operating voltage in the neutral state of contact 9-2.

The energization of relay 9 pertaining to circuit 0 is dependent upon the position of switch 6 and is further dependent upon the position of reversible switch 7. Relay 9 will be energized for moving containers out of freight space i.e. for reversing the direction of movement. During loading one may at times wish to reverse lever 5 and switch 6 to obtain the middle or neutral position of switch 6, this means that all the relays 14 of all the stations are disconnected and the system is in fact halted. This may occur for example, during some interference and now the various containers can be moved manually because there is no latching involved.

For an unloading operation, the lever 5 on the control panel is moved to the left. Accordingly, the transport mode switch 6 energizes a left hand coil of the reversing relay 7. Previously, the right hand coil of reversing relay 7 was energized, and now, upon energizing the left hand coil, the reversing relay 7 assumes the left hand switching state. On the other hand, if the relay 7 is already in the left hand switching state no change in position obtains as far as a reversing relay 7 is concerned. The contact 7-2 of relay 7 is used to feed positive operating voltage to the relay 9 in station 0. On energization, relay 9 connects the output of clock 8 to line 82. Contact 7-2 also provides positive operating voltage to all relays 13 in all stations.

The clock 8, which was previously connected to the first station A, but is now connected via line 82 to the last station which is R. The relays 13 with their respective contacts 13-2 connects the holding circuits for the relays 14 from what was previously the following station to what is now the preceding storage location. Since however, the direction of transport is being reversed, the connection runs again to the next following storage location but now, of course, in a descending order, namely from R through A.

Owing to the change in position of switch 6 by means of the lever 5, the clock is again connected through contact 71 of relay 7. The first clock pulse that occurs after this changeover has been effected will be fed to the circuit of station and location R through the resting position of the 11-1 contact of station R and to the relay 14 thereof. All of relays 14 hold as they have been prepared through the 7-1 contact. As the clock is being turned on, the relay 14 of the last storage location R does indeed respond. The relay 14 of station and location R then holds through its own holding contact 14-1, the working state of contact 13-2 in station P (not shown) and the resting state of contact 11-2 of that station being connected to the positive voltage supply source.

As relay 14 has responded in the last storage location R, the contact 14-2 thereof connects the associated drive PDU in station R to power. Moreover, the working contact 13-4 position of relay 13 of station R turns on the PDU drive of the preceding station. The container, as a consequence of the single movement of lever 5 is automatically moved out of the transport path at a rate given with a clock 8. As long as the clock 8 provides pulses, there is an automatic turning on and off of the respective drives and progressing until the storage locations are emptied. The holding circuit for the relay 14 in the circuit of station A is run through the working state of contact 9-2 in circuit station 0 to the positive voltage supply. Upon moving containers thus out of the cargo space, the control system remains turned on only as long as lever 5 has connected the directional transported mode switch 6 into one or the other position.

It can, thus, be seen that relay 13 has a directional control function in the following sense. Depending upon the position, the holding circuit for the drive control relay 14 of a position and station runs either through the directional relay contacts of the next station or of the preceding station. Analogously, the directional control relay activates the drive of the succeeding or the preceding station. Thirdly, the directional control relay 13 coordinates, through contacts 13-3, the clock pulse traffic from one station to either the preceding or the succeeding one.

Having described thus far a complete loading and unloading operation, partial loading and partial unloading is likewise possible and will be described. For this operation there are provided the switches 1 which have not yet been described as to their effectiveness in FIG. 2. They were shown in FIG. 1. These switches 1 are provided respectively for each of the the stations A-R. In case of partially loading the storage facility, for example, just the stations A and B, the switch 1 pertaining to station B must be place in an on or ready or prepared position and of course, switch for station C must be off. In FIG. 1, stations R, P, M, and L are shown off in this example, station R is on, making the last station that can be occupied.

Assuming that station B is on station, C is off, i.e. it is neutral as to the respective switches. This state results in changing the position of the respective relay 11 in both stations A and B to a left position, while the relay 12 in station C is permanently connected to be energized through the respective switch 1 of that station. This means that the contact 12-1 in station C receives positive voltage which is fed through the ready state of switch 1 is station B to the left coils of the relay 11 in both stations A and B. No such connection exists in the other stations. This then is the function of switch 1 in station C. In addition, the diodes in station C prevent the transmission of positive supply voltage in the wrong direction. The switch 1 in station C, moreover, energizes the holding circuit for relay 14 in station B continuously with positive voltage so that the drives PDU for stations and locations A and B remain connected while the drives for the location C remains off, owing to the changeover of contact 12-2 in that station. The operation is actually obtained and initiated through appropriate operation of the lever 5.

For partially unloading, one has to adjust the respective switches 1 as described in the appropriate pattern, with the switch state indicating pieces of freight are to be removed. This means that again through the corresponding adjustment of lever 5, the mode switch 6 causes the requisite change of the respective relay 13 in order to change the transport direction, from loading to unloading.

The invention is not limited to the embodiments described above, but all changes and modifications thereof not constituting departures from the spirit and scope of the invention are intended to be included.

We claim:

1. A control device for controlling the transport of containers into and out of storage locations and stations in the mobile cargo space, there being a drive in each of the stations, comprising:
    a main control circuit including a manually operable transport mode control switch operating a bi-stable switching stage;
    a clock pulse generator connected to be enabled by the bi-stable switching stage;
    a switching means (i) in the main control circuit operated by the mode control switch and the bi-stable switching stage for connecting an output of the clock generator to a first and a second clock line;
    drive control relay means in each station and including a holding circuit in each instance, and having contact means for operating of the respective drive of the station, all said drive control relay means being enabled by said bi-stable switching stage;
    clock pulse circuit means connected to said first and second clock lines and connected to all stations for causing a clock pulse when received and not passed to another station, to operate the drive control relay;
    directional control means in each respective station operated by said mode control switch, and having (a) a first circuit means for causing the drive of a preceding or of a succeeding station to be turned on in response to a response of the pulse control relay of the respective station; (b) a second circuit connected to the clock pulse circuit for determining the direction of clock pulse propagation through such clock pulse circuit or diversion to the drive control relay of the respective station;
    switch means in each station and pertaining to the clock pulse circuit means thereof, for diverting a clock pulse out of the circuit means if the drive control relay of the respective station was operated by a preceding clock pulse to affect the clock pulse circuit means of the succeeding or the preceding station depending upon an operational state of the directional control means (b); and
    a further switch means (ii) in the main control circuit also operated by the mode control switch for connecting a supply voltage selectively to a first and a last of the stations to function as power supply for the drive holding circuit herein.

2. A control device as in claim 1, the directional control means in each station including circuit means (c) in the holding circuits for the drive control in the succeeding and the preceding station, depending upon the direction of transport as determined by the mode control.

3. A device as in claim 1, wherein the switch means in each station and pertaining to the clock pulse circuit means is a bistable device.

4. A device as in claim 1, wherein said manually controlled transport mode switch provides power to all said drive control relays, but in a neutral position renders power therefrom to prevent automated turning on or blocking of the drives.

5. A device as in claim 4, said mode switch also providing power to said clock pulse generator.

6. A device as in claim 1, and including further switch means in each station for adjusting each station to be a last one in a series of storage locations less than the total number of locations.

7. In a control device for controlling the transport of containers into and out of storage locations and stations in a mobile cargo space, there being a drive in each of the stations, comprising:
- drive control relay means in each station and including a holding circuit in each instance, and having contact means for operating of the respective drive of the station;
- clock pulse circuit means, including a generator connected to all stations for causing a clock pulse when received and not passed to another station, to operate the drive control relay;
- directional control means in each respective station having (a) a first circuit means for causing the drive of a preceding or of a succeeding station to be turned on in response to a response of the pulse control relay of the respective station;
- (b) a second circuit connected to the clock pulse circuit for determining the direction of clock pulse propagation through such clock pulse circuit and into the drive control relay of the respective station;
- circuit means (c) in the holding circuits for the drive control relay in a succeeding and a preceding station; and
- clock pulse operated circuit means in the preceding and the succeeding station to interrupt a holding circuit completed through the preceding or the succeeding station.

8. In a control device for controlling the transport of containers into and out of storage locations and stations in a mobile charge space, there being a drive in each of the stations, the improvement comprising:
- a main control circuit including a manually operable transport mode control switch operating a bi-stable switching stage;
- a clock pulse generator, connected to be enabled by the bi-stable switching stage;
- a switching means (i) in the main control circuit operated by the mode control switch and the bi-stable switching stage for connecting an output of the clock generator to a first and a second clock line; and
- drive control relay means in each station and including a holding circuit in each instance, and having contact means for operating of the respective drive of the station, all said drive control relay means being enabled by said bi-stable switching stage and said transport mode switch, the latter switch, when in a neutral position, avoiding enabling of said relay means.

9. A control device for controlling the transport of containers into and out of storage locations and stations in a mobile cargo space, there being a drive in each of the stations, comprising:
- a main control circuit including a manually operable transport mode control switch operating a bi-stable switching stage;
- drive control relay means in each station and including a holding circuit in each instance, and having contact means for operating of the respective drive of the station, all said drive control relay means being enabled by said bistable switching stage;
- directional control means in each respective station operated by said mode control switch, for causing selectively the drive of a preceding or of a succeeding station to be turned on; and
- a switch means in the main control circuit operated by the mode control switch for connecting a supply voltage selectively to a first and a last of the stations to function as power supply for the drive holding circuit herein.

* * * * *